United States Patent
Wang et al.

(10) Patent No.: US 9,940,935 B2
(45) Date of Patent: *Apr. 10, 2018

(54) METHOD AND DEVICE FOR VOICEPRINT RECOGNITION

(71) Applicant: Tencent Technology (Shenzhen) Company Limited, Shenzhen (CN)

(72) Inventors: Eryu Wang, Shenzhen (CN); Li Lu, Shenzhen (CN); Xiang Zhang, Shenzhen (CN); Haibo Liu, Shenzhen (CN); Lou Li, Shenzhen (CN); Feng Rao, Shenzhen (CN); Duling Lu, Shenzhen (CN); Shuai Yue, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,696

(22) Filed: Aug. 18, 2016

(65) Prior Publication Data

US 2016/0358610 A1  Dec. 8, 2016

Related U.S. Application Data

(63) Continuation of application No. 14/105,110, filed on Dec. 12, 2013, now Pat. No. 9,502,038, which is a
(Continued)

(30) Foreign Application Priority Data

Jan. 28, 2013 (CN) .......................... 2013 1 0032846

(51) Int. Cl.
*G10L 15/16* (2006.01)
*G10L 17/18* (2013.01)
(Continued)

(52) U.S. Cl.
CPC .............. *G10L 17/18* (2013.01); *G10L 17/02* (2013.01); *G10L 17/04* (2013.01); *G10L 17/08* (2013.01)

(58) Field of Classification Search
CPC ....... G10L 15/16; G10L 15/06; G10L 15/063; G06N 3/08; G06N 3/02; G06N 5/047
(Continued)

(56) References Cited

U.S. PATENT DOCUMENTS 6,128,609 A * 10/2000 Rose ........................ G06N 3/08
706/23
2004/0225498 A1* 11/2004 Rifkin ..................... G10L 17/02
704/250

(Continued)

*Primary Examiner* — Jakieda Jackson
(74) *Attorney, Agent, or Firm* — Morgan, Lewis & Bockius LLP

(57) ABSTRACT

A method is performed at a device having one or more processors and memory. The device establishes a first-level Deep Neural Network (DNN) model based on unlabeled speech data, the unlabeled speech data containing no speaker labels and the first-level DNN model specifying a plurality of basic voiceprint features for the unlabeled speech data. The device establishes a second-level DNN model by tuning the first-level DNN model based on labeled speech data, the labeled speech data containing speech samples with respective speaker labels, wherein the second-level DNN model specifies a plurality of high-level voiceprint features. Using the second-level DNN model, registers a first high-level voiceprint feature sequence for a user based on a registration speech sample received from the user. The device performs speaker verification for the user based on the first high-level voiceprint feature sequence registered for the user.

18 Claims, 7 Drawing Sheets

Related U.S. Application Data continuation of application No. PCT/CN2013/085735, filed on Oct. 23, 2013.

(51) Int. Cl.
| | | |
|---|---|---|
| *G10L 17/02* | (2013.01) | |
| *G10L 17/04* | (2013.01) | |
| *G10L 17/08* | (2013.01) | |

(58) Field of Classification Search
USPC .......................................................... 704/232
See application file for complete search history.

(56) References Cited

U.S. PATENT DOCUMENTS

| | | | | |
|---|---|---|---|---|
| 2006/0149558 | A1* | 7/2006 | Kahn | G10L 15/063 |
| | | | | 704/278 |
| 2007/0294083 | A1* | 12/2007 | Bellegarda | G10L 17/04 |
| | | | | 704/250 |
| 2013/0080369 | A1* | 3/2013 | Zadeh | G06N 7/02 |
| | | | | 706/48 |
| 2014/0067735 | A1* | 3/2014 | Yu | G06N 3/04 |
| | | | | 706/20 |
| 2014/0142929 | A1* | 5/2014 | Seide | G06N 3/08 |
| | | | | 704/202 |
| 2015/0199963 | A1* | 7/2015 | Maaninen | G10L 15/28 |
| | | | | 704/232 |

* cited by examiner

METHOD AND DEVICE FOR VOICEPRINT RECOGNITION

RELATED APPLICATIONS

This application is a continuation application of U.S. application Ser. No. 14/105,110, filed Dec. 12, 2013, entitled "METHOD AND DEVICE FOR VOICEPRINT RECOGNITION", which is a continuation of PCT Patent Application No. PCT/CN2013/085735, entitled "METHOD AND DEVICE FOR VOICEPRINT RECOGNITION" filed on Oct. 23, 2013, which claims priority to Chinese Patent Application Serial No. CN201310032846.9, entitled "METHOD AND DEVICE FOR VOICEPRINT RECOGNITION", filed Jan. 28, 2013, all of which are incorporated herein by reference in its entirety.

FIELD OF THE INVENTION

The present invention relates to the identity authentication technical field, especially relates to the method and device for voiceprint recognition.

BACKGROUND OF THE INVENTION

Voiceprint recognition (VPR) is a kind of biological recognition technology, also known as speaker recognition. Speaker recognition includes two categories, one is speaker identification, and the other is speaker verification. Speaker identification is used to determine which one of several people has produced a particular speech segment. This is a question of choosing one from multiple alternatives. Speaker verification is used to confirm whether a certain speech is produced by a specified person or not. This is a question of "one-to-one differentiation.

VPR includes a text-dependent variety and text-independent variety. A text-dependent VPR system requires the users to speak content selected according to specific rules, and the voiceprint model of every person is established accurately one by one; and a speaker shall also speak the specified content when recognition is performed, such that the system can produce a better recognition result. However, the system needs the cooperation of users; if the speech of a user is inconsistent with the specified content, the system will not be able to properly recognize this user. A text-independent VPR system does not stipulate on the content of speech produced by a speaker, and the model establishment is relatively difficult. However, it is more convenient for users to use, and has a wide range of applications.

In the conventional speaker recognition technology, all of the mainstream recognition systems use the characteristics of the spectral base, such as Mel-Frequency Cepstral Coefficients (MFCC), Perceptual Linear Predictive (PLP) analysis, Linear Predictive Cepstral Coefficients (LPCC), etc. These all come from the relatively visual spectrograms and are easily affected by various kinds of noises. However, in the application scenario of speaker recognition technologies, the collected speech data is unlikely to be clean, the types of noise contained in the speech data are complex, and signal to noise ratio is very poor. If conventional fundamental spectral base characteristics are used, a large amount of noise compensation needs to be applied on the feature extraction side, modeling side, and scoring side upon the feature extraction. This means larger computation complexity and latency, and cannot completely eliminate the noise effect.

SUMMARY

In one aspect, a method of voiceprint recognition, includes: at a device having one or more processors and memory: establishing a first-level Deep Neural Network (DNN) model based on unlabeled speech data, the unlabeled speech data containing no speaker labels and the first-level DNN model specifying a plurality of basic voiceprint features for the unlabeled speech data; obtaining a plurality of high-level voiceprint features by tuning the first-level DNN model based on labeled speech data, the labeled speech data containing speech samples with respective speaker labels, and the tuning producing a second-level DNN model specifying the plurality of high-level voiceprint features; based on the second-level DNN model, registering a respective high-level voiceprint feature sequence for a user based on a registration speech sample received from the user; and performing speaker verification for the user based on the respective high-level voiceprint feature sequence registered for the user.

In some embodiments, a system for voiceprint recognition includes: one or more processors and memory having instructions stored thereon, the instructions, when executed by the one or more processors, cause the processors to perform the above method.

According to embodiments of the present invention, we can effectively start from base spectral characteristics, through the use of deep neural networks to extract and learn the high-level speaker information that can withstand the interference of noise, thereby effectively reduce the interference of noise during speaker identification and speaker verification.

In addition, some embodiments of the present invention can be applied on the feature extraction side such that features that are robust against noise interference can be extracted directly, when there is limit on computational costs. When there is no constraints on computational costs, after the features are extracted, conventional signal compensation methods can still be applied to improve the functions of the system even further.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
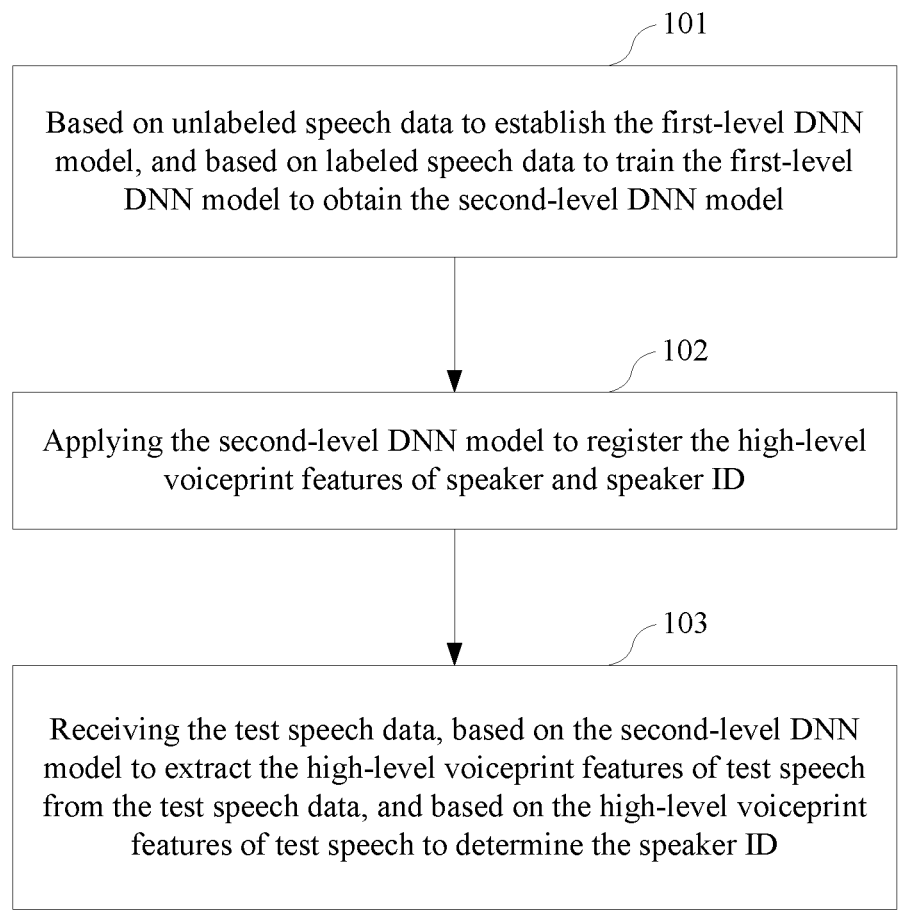
FIG. 1 is a flowchart diagram of voiceprint recognition method based on some embodiments of the present invention.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Firstly, speaker identification is a multi-classification problem and speaker verification is a binary classification problem. The multi-classification problem can be transformed into multiple binary classification problems. The speaker verification problem is used herein as an example to explain the relevant details of the present invention. In practice, a person skilled in the art would recognize that the embodiments of the present invention are applicable for the speaker identification problem as well.

Text-independent speaker recognition does not require storing specific textual password, rather, the speech of a speaker is used directly as the password. The text-independent speaker recognition can be widely applied in the security fields of Internet user identity authentication, etc. Embodiments of the present invention are suitable for the text-independent applications.

Some speaker recognition systems use the Generalized Method of Moments-Universal Background Model (GMM-UBM) technical framework. Firstly, it uses a corpus containing speech data of lots of speakers to train a universal background model (UBM) that is speaker-independent. Then, it uses available speech data of a relatively small number of speakers, to train and obtain a speaker-dependent model according to the Maximum A Posteriori (MAP) or Maximum Likelihood Linear Regression (MLLR) criterion.

When carrying out the speaker identity determination, the similarities between test speech data and each speaker's GMM model and UBM model are calculated, and a final score is calculated by the measurement of logistic likelihood ratio (LLR). For the speaker verification task, determination can be made by comparing the score with a preset threshold. For the speaker recognition task, the model with the highest score is the speaker recognition result.

Due to the problem of unmatched signal channels between the test speech data and the training speech data, the available technology leads to unnecessary interferences to the recognition process. Therefore, channel compensation technology has become especially important. In the conventional speaker recognition task, the method of joint factor analysis (JFA) is used to eliminate the performance losses caused by a variety of possible channel interferences.

Since the joint factor analysis system training and test need to consume more system resources, an I-factor method has been used widely for the recent years. Through the factor analytical method, a load space able to reflect the speech data of whole sentences can be trained. Then, the load factor can be extracted. In other words, the I-factor represents the information contained in the speech data. Next, unnecessary non-speaker information can be eliminated by conducting the linear discriminant analysis (LDA) and within-class covariance normalization (WCCN). After that, cosine kernel or Logistic Likelihood Ratio (LLR) measure can be used to calculate the degree of similarity, and then perform speaker identity determination.

However, in the conventional speaker recognition technology, basically all of them use the characteristics of the spectral base, such as MFCC, PLP, LPCC, etc. All of those characteristics come from the relatively visual spectrograms and are easily affected by various kinds of noises. However, in the application scenario of speaker recognition technology, the collected speech data is unlikely to be clean, the noise types contained in the speech data are complex, and signal to noise ratio is very poor. If conventional fundamental spectral base characteristics are used, a large amount of noise compensation needs to be performed on the feature extraction side, the modeling side, and the scoring side after the feature extraction. This can lead to larger computation complexities and latencies, and cannot completely eliminate the noise effect. In the human perception experiment, it has been known that the high-level characteristics of pitch, fundamental frequency, formant, idiom, etc. are not easily affected by noise; however, the conventional speaker recognition methods can't apply this information directly to the speaker recognition in a real environment.

In some embodiments, the present invention starts effectively from the basic speech spectrum characteristics, through the user of deep neural networks, automatically learns from the speech data those high-level speaker information that are proven to be robust against noise interferences.

The neural network method simulates the process of how humans process acoustic information through a multi-layer network structure. The input of the neural network is the original fundamental acoustic characteristics; as the input passes through an increasing number of processing layers, the output information is more and more biased towards to information with certain physical meaning and certain abstract concepts. Embodiments of the present invention effectively extract the high-level speaker identity information through the aforementioned process.

Embodiments of the present invention can be applied on the feature extraction end, under circumstances with limited computational budget; and robust characteristics can be directly obtained and used for the application of speaker recognition. In the absence of computing resource limitations, after the characteristics are obtained, the original channel compensation algorithms can still be applied to the characteristics to obtain further performance improvements.

The training of the deep neural network includes pre-training steps using unlabeled data and fine adjustment (or tuning) steps using labeled data. So, embodiments of the present invention can make use of a large amount of unlabeled data to address the problem of big data application to some extent, and only a relatively small amount of labeled data is needed to utilize all of the available data.

FIG. 1 is a flowchart diagram of a voiceprint recognition method based on some embodiments of the present invention.

As is shown in FIG. 1, the method includes:

Step 101: Based on unlabeled speech data to establish a first-level deep neural network (DNN) model, and based on labeled speech data to train the first-level DNN model to obtain a second-level DNN model.

Here, basic voiceprint features of the unlabeled speech data are extracted from the unlabeled speech data; then based on these basic voiceprint features of the unlabeled speech data, the first-level DNN model is built for use in extracting the high-level voiceprint characteristics. After that, the basic voiceprint features of the labeled speech data are extracted from the labeled speech data; then based on these basic voiceprint features of the labeled speech data, the first-level DNN model is trained to obtain the second-level DNN model, which is then used for extracting the high-level voiceprint features related to the speakers.

As used herein, the unlabeled speech data is the speech data that are not labeled with speaker identity information, and the labeled speech data is the speech data that is labeled by speaker identity information.

In some embodiments, sparse coding limiting rules and/or maximum cross entropy rules can be applied to train the first-level DNN model based on the labeled speech data, to obtain the second-level DNN model.

In some embodiments, based on the constraints that the distance between the high-level voiceprint features obtained from different speech data of the same speaker decreases and the distance between the high-level voiceprint features obtained from the same speech data of different speakers increases, the first-level DNN model is trained to obtain the second-level DNN model.

Thus, based on the above, in some embodiments, a process for obtaining second-level DNN model includes: establishing a first-level Deep Neural Network (DNN) model based on unlabeled speech data, the unlabeled speech data containing no speaker labels and the first-level DNN model specifying a plurality of basic voiceprint features for the unlabeled speech data; and obtaining a plurality of high-level voiceprint features by tuning the first-level DNN model based on labeled speech data, the labeled speech data containing speech samples with respective speaker labels, and the tuning producing a second-level DNN model specifying the plurality of high-level voiceprint features.

In some embodiments, tuning the first-level DNN model based on the labeled speech data to produce the second-level DNN model further include: imposing at least two constraints during adjustment of the first-level DNN based on the labeled speech data, including: (1) distances between characteristic voiceprints generated from speech samples of different speakers increase with training, and (2) distances between characteristic voice prints generated from speech samples of same speakers decrease with training.

In some embodiments, tuning the first-level DNN model based on the labeled speech data further include: applying sparse coding limit rules to train the first-level DNN model based on the labeled speech data.

In some embodiments, tuning the first-level DNN model based on the labeled speech data further include: applying maximum cross entropy rules to train the first-level DNN model based on the labeled speech data.

Step 102: apply the second-level DNN model to register the high-level voiceprint features of a speaker and associated speaker label.

Here, the basic voiceprint features of a speaker are extracted from registered speech samples of the speaker by: applying the second-level DNN model to the basic voiceprint features of the speaker to obtain the high-level voiceprint features of speaker; and then establishing a correspondence relation between the high-level voiceprint features of speaker and the speaker label of the speaker.

Thus, according to the above, in some embodiments, the method of voiceprint recognition further includes: based on the second-level DNN model, registering a respective high-level voiceprint feature sequence for a user based on a registration speech sample received from the user. The high-level voiceprint feature sequence includes an ordered sequence of high-level voiceprint features that have been extracted from the registration speech samples provided by the user using the first-level DNN model and the second-level DNN model, as described above.

In some embodiments, based on the second-level DNN model, registering the respective high-level voiceprint feature sequence for the user based on the registration speech sample received from the user, further includes: obtaining a respective basic voiceprint feature sequence for the user from the registration speech sample based on the first-level DNN model; and providing the respective basic voiceprint feature sequence as input to the second-level DNN model to obtain the respective high-level voiceprint feature sequence for the user.

Step 103: receive test speech data; based on the second-level DNN model, extract the high-level voiceprint features of the test speech from the test speech data, and based on the high-level voiceprint features of the test speech, determine the speaker label for the test speech.

Here, the basic voiceprint features of the test speech are extracted from the test speech data; based on the second-level DNN model and according to the basic voiceprint features of the test speech, the high-level voiceprint features of the test speech obtained; and then based on the high-level voiceprint features of the test speech, the speaker label of the test speech can be determined (e.g., in a speaker identification task), or if no known speaker label can be assigned to the test speech, the speaker identity cannot be verified (e.g., in a speaker verification task).

In some embodiments, based on the high-level voiceprint features of the test speech that has been extracted from the test speech data using the second-level DNN model, a Gaussian model of the high-level voiceprint features of the test speech is established; then the distance between the Gaussian model of the high-level voiceprint features of the test speech and a Gaussian model of the registered high-level voiceprint features is calculated; then, the speaker label is determined based on the distance.

For example, in the speaker verification scenario, it is determined whether the distance between the Gaussian model of the high-level voiceprint features of the test speech and the Gaussian model of the registered high-level voiceprint features of the registered speaker is lower than a preset threshold; if yes, it is determined that the speaker of the test speech is the registered speaker. Otherwise, it is determined that the speaker of the test speech is not the registered speaker.

In the speaker identification scenario, the smallest value of the distance between the Gaussian model of the high-level voiceprint features of the test speech and the respective Gaussian models of the registered high-level voiceprint features of multiple speakers is identified; the registered speaker corresponding to the smallest value of the distance is determined to be the speaker of the test speech.

Based on the above, in some embodiments, the method of voiceprint recognition further include: performing speaker verification for the user based on the respective high-level voiceprint feature sequence registered for the user.

In some embodiments, performing speaker verification for the user based on the respective high-level voiceprint feature sequence registered for the user, further include: receiving a test speech sample; obtaining a respective high-level voiceprint feature sequence from the test speech sample using the first-level DNN model and the second-level DNN model in sequence; comparing the respective high-level voiceprint feature sequence obtained from the test speech sample to the respective high-level voiceprint feature sequence registered to the user; and verifying the user's identity based on a Euclidean distance between respective Gaussian models of the respective high-level voiceprint feature sequence obtained from the test speech sample and the respective high-level voiceprint feature sequence registered to the user.

Based on the aforementioned flow, some embodiments of the present invention are explained more specifically in the following.

Some embodiments of the present invention mainly include two parts: the first is to construct the second-level DNN used for extracting the high-level features that reflect speaker identity information, and then apply the extracted high-level features that reflect speaker identity information to accomplish the speaker recognition.

The structure of a deep neural network will be described in the following.

Figure 2:
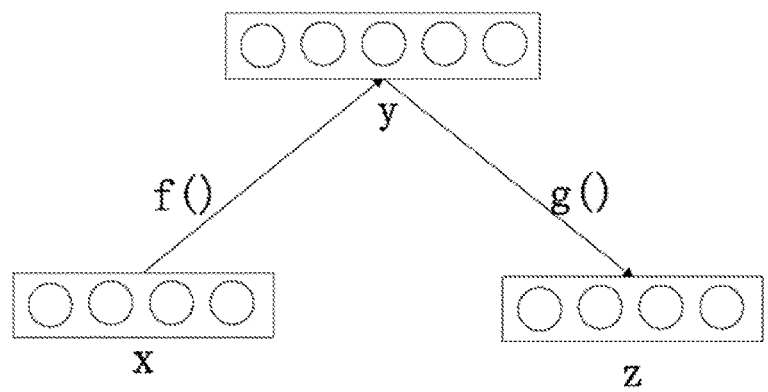
FIG. 2 is a schematic diagram of the basic unit of deep neural network based on some embodiments of the present invention.
Figure 3:
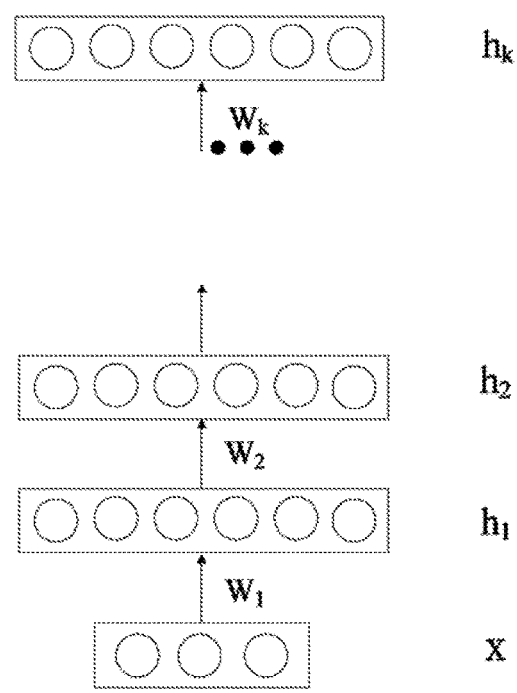
FIG. 3 is a schematic diagram of deep neural network stratification based on some embodiments of the present invention.

FIG. 2 is a schematic diagram of the basic unit of a deep neural network based on some embodiments of the present invention; FIG. 3 is a schematic diagram of a deep neural network stratification based on some embodiments of the present invention.

As shown in FIG. 2 and FIG. 3, the deep neural network used for obtaining high-level voiceprint features related to a speaker is a network structure with multiple layers, and the layers can be connected with each other by some mapping functions. In the network, any two connected layers both adopt the structure with reconstruction abilities, which can be called a basic unit of a deep neural network.

For example, the basic units can be Denoising Autoencoders (DAs) or Restrictive Boltzmann Machines (RBMs) and so on.

Take DAs as an example for this description, a DA is a two-layer bidirectional mapping network, including an input layer and an output layer, as shown in FIG. 2. input characteristics (e.g., represented by an input feature vector x) in the input layer are mapped into the output layer as output characteristics (e.g., represented by an output feature vector y) by a mapping function $f(\ )$. At the same time, the output characteristics (e.g., represented by the output feature vector y) in the output layer can also be mapped onto the input layer by a mapping function $g(\ )$, as reconstruction characteristics (e.g., represented by a reconstruction feature vector z). By the principle of minimum reconstruction error (e.g., the distance between x and z is minimized), it is unnecessary for the training data to be labeled by speaker information here in order to perform unsupervised training on the mapping function $f(\ )$ and $g(\ )$. In some embodiments, the mapping functions are linear mapping functions. The form of the forward mapping function $f(\ )$ is $Wx+b$, where W is the mapping matrix, x is the input feature vector, and b is the offset vector. The form of the backward mapping function $g(\ )$ is $W'y+c$, where $W'$ is the transposition of the mapping matrix W in the forward mapping function and c is the offset vector. During mapping of DAs from x in the input layer to y in the output layer, a certain degree of random noise is added in, and the added noise can help avoid the basic unit being trapped in the problem of over training.

After having introduced the basic structure of any two connected layers, through the mode of cascading, multiple basic units can be cascaded to form a deep neural network from bottom to top.

As shown in FIG. 3, $x \rightarrow h1$ is the first basic unit, $h1 \rightarrow h2$ is the second basic unit, h1 is the output vector of the first basic unit, as well as the input vector of the second basic unit.

Specifically, before h1 becomes the input vector of the second basic unit, each of the dimension values of the vector h1 is required to pass through a sigmoid function. The output of a sigmoid function is a numerical value in the range of [0, 1]. A random number is selected according to a uniform distribution in [0, 1], and compared to the output of the sigmoid function. If the output of the sigmoid function is larger than the random number, then the numerical value of h1 in the dimension is set as 1, otherwise, it is set as 0. In this way, in the construction of the deep neural network, a certain degree of randomness is added in artificially. Thus, on the basis of learning the existing feature characteristics, this can not only produce some similar new feature characteristics, but also reduce interferences from noises that have the same patterns.

Because each layer of the deep neural network has a reconstruction function, a greedy algorithm can be applied to train the deep neural network structure from the bottom to the top. The initial feature input of the network structure is the basic voiceprint features, and through the processing of multiple network layers, the ultimate feature output is the high-level voiceprint features having certain abstract meaning and physical meaning. The network structure obtained by the training of this step can help ensure that the high-level features can be reconstructed into the basic voiceprint features with minimum cost, which does not have the effect of distinguishing between speaker information and interference information.

After obtaining the first-level model of the mapping network structure, in order to eliminate/reduce the effect of non-speaker noise in the high-level features, the current network structure model needs to be further adjusted (fine-tuned). Here, a relatively small amount of labeled speech data is needed, in other words, speech data that have corresponding speaker identity information are required now.

In FIG. 3, if the feature vector in the bottom layer is x, then the feature vector obtained in the highest layer will be hk. Before this step, the feature vector hk includes the representative speaker information and additional noise information. In this step, the speaker information needs to be preserved and the noise information needs to be suppressed.

In some embodiments, two constraints can be proposed during training. First, when different speech data of the same speaker are provided to the input end, the distance between output feature vectors obtained at the output layer shall decrease; and when speech data of different speakers are provided to the input end, the distance between output feature vectors obtained at the output layer shall increase (here, the output layer corresponds to layer hk in FIG. 3). In addition, to ensure that the output feature vectors can be used to reconstruct the input feature vector, when reducing other losses brought by the addition of speaker information, the reconstruction error of the new structure of the speech data shall also be considered. The aforementioned two constraints can be considered comprehensively to constitute the target functions. Then, Back Propagation (BP) operations of the neural network training can be applied to further adjust the structure of the deep neural network. After this step, a second-level DNN model having the same typological structure as the first-level DNN model can be obtained, but the various parameters of this second-level model, such as $W_n$, are not the same as first-level model.

During fine-tuning from the first-level DNN model to the second-level DNN model, the second-level DNN model is made to have the ability to extract high-level speaker information. This step plays an important role in extracting the features by the deep neural network. In addition to the aforementioned embodiments, other different target functions, such as sparse coding limiting rules for the output layer of the deep neural network, and maximum cross entropy rules, and so on, can be applied as well.

By using the second-level DNN model, the basic voiceprint features can be mapped as the speaker-dependent high-level voiceprint features.

After obtaining the basic voiceprint information, such as the MFCC feature sequence, these features can be provided as input into the trained second-level DNN model, then, the output vector collected in output terminal of the neural network, which is a vector sequence, would be the high-level voiceprint features.

As shown in FIG. 2 and FIG. 3, the high-level feature vector hk can be obtained by inputting a feature vector x into the bottom layer of the second-level DNN model. If the input feature vector for the bottom layer is a time sequence, e.g., $\{x^1, x^2, \ldots, x^n\}$, the output vector in the top layer will also be a time sequence, e.g., $\{hk^1, hk^2, \ldots, hk^n\}$.

Figure 4:
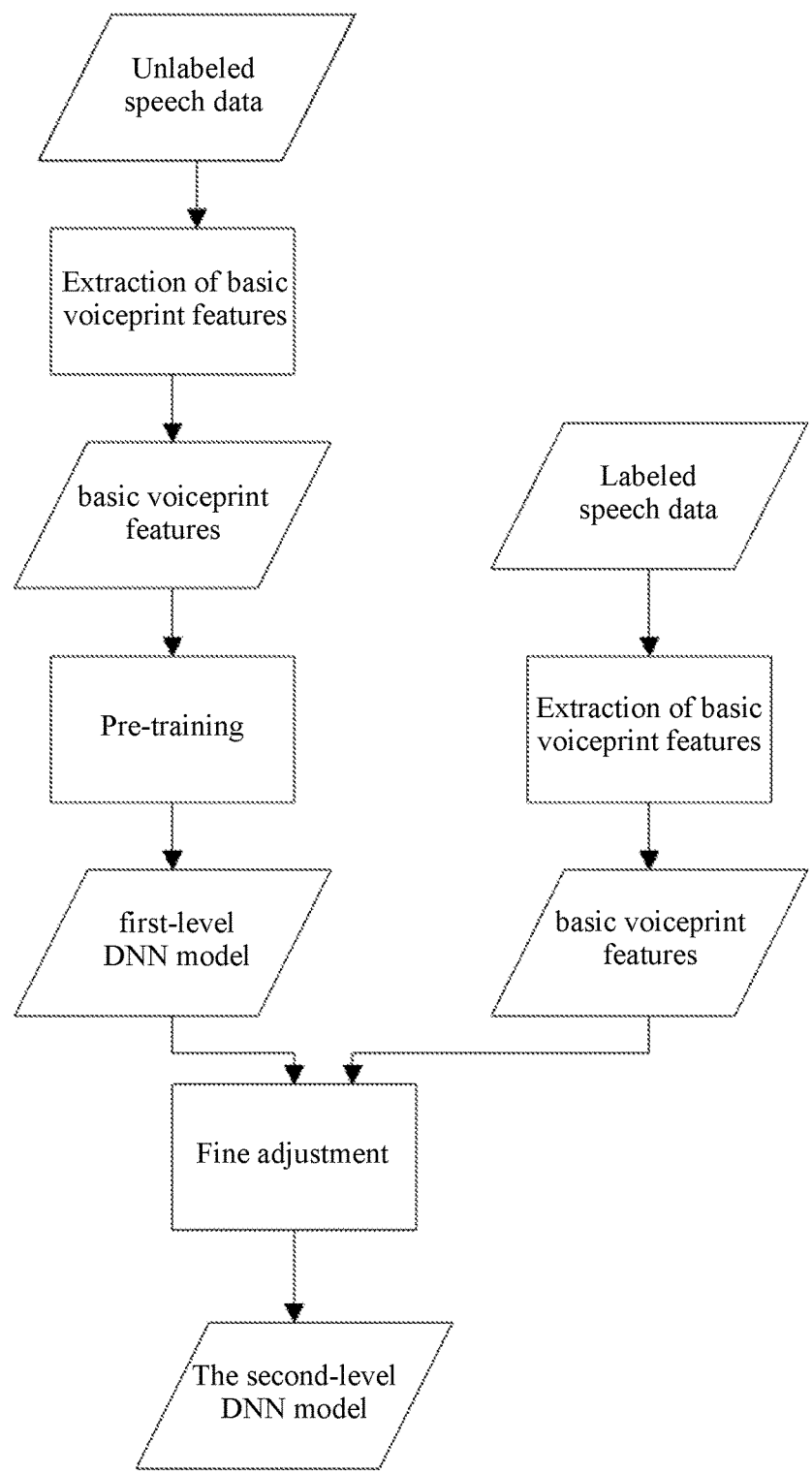
FIG. 4 is a process schematic diagram for establishing the second-level DNN model according to some embodiments of the present invention.

FIG. 4 is a process schematic diagram of establishing the second-level DNN model in accordance with some embodiments of the present invention.

As shown in FIG. 4, in the process of constructing the second-level DNN model, first, a corpus containing a large amount of speech data is collected. In the corpus, the speech data does not need to be labeled with speaker identity information, namely, each speech sample in the corpus does not need to be associated with respective speaker identity information indicating who produced the speech sample. Generally, it is preferable to include speech samples from as many speakers as possible in the corpus.

Then, through a basic voiceprint feature extraction process, the input speech data are transformed into basic voiceprint features of the bottom layer, the commonly used features are MFCC, LPCC, PLP and other characteristics. These characteristics or features are easily affected by environmental noise. Noisy speech include, for example, the speech signals collected at the places such as subways, airports, train or bus stations, restaurants, and so on; the speech signals collected from speaker in the state of being happy, sulky, angry, or worried, and so on; and the speech signal collected through microphones, telephones, mobile phones, and so on.

The basic voiceprint features of the aforementioned collected unlabeled speech data can be used to establish the first-level DNN model (the initial model for the DNN model used for extracting high-level voiceprint features). This mapping structure can map the bottom layer characteristics to the high layer characteristics; however, this high layer information contains a great deal of information irrelevant to speakers.

Then, a small amount of speech data can be collected, where these speech data contain the labels of speaker identity information. The same bottom layer feature extraction can be conducted for these data. Then combined with the first-level DNN model obtained in the previous step, through fine adjustments, the second-level DNN model can be established. This second-level DNN model can completely map the bottom layer characteristics to the speaker-dependent model, which greatly eliminates the effect of non-speaker noise.

After the complete establishment of the second-level DNN model, the second-level DNN model is used to register a speaker and carry out speaker recognition processing for the speaker.

Figure 5:
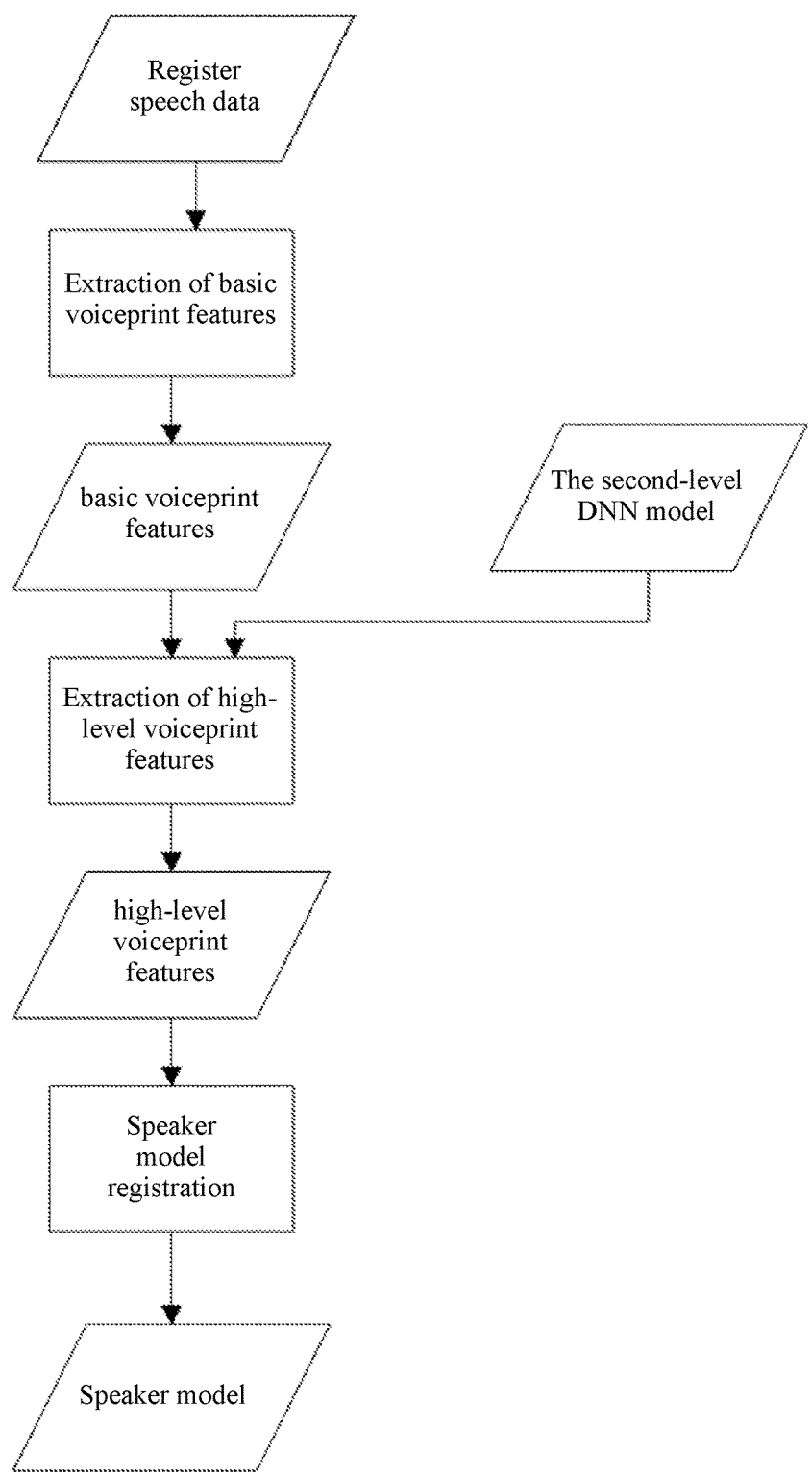
FIG. 5 is a process schematic diagram for registering a speaker based on some embodiments of the present invention.

FIG. 5 is a schematic diagram of a speaker registration process in accordance with some embodiments of the present invention.

As shown in FIG. 5, in some embodiments, the second-level DNN model is applied to extract the high-level feature sequence from registration information (e.g., registration speech samples) of a registering speaker, and a Gaussian model corresponding to the high-level feature sequence of this speaker's registration information (e.g., registration speech samples) is generated, in order to obtain the model parameters for the speaker.

Specifically, in some embodiments, registration speech data (e.g., one or more registration speech samples) of the registering speaker is obtained. Basic voiceprint features are extracted from the registration speech data, to obtain the registered basic voiceprint features for the speaker. Then, the second-level DNN model is applied to extract registered high-level voiceprint features from the registered basic voiceprint features. A registered Gaussian model corresponding to the registered high-level voiceprint features is established, which is the registered model for the speaker.

Figure 6:
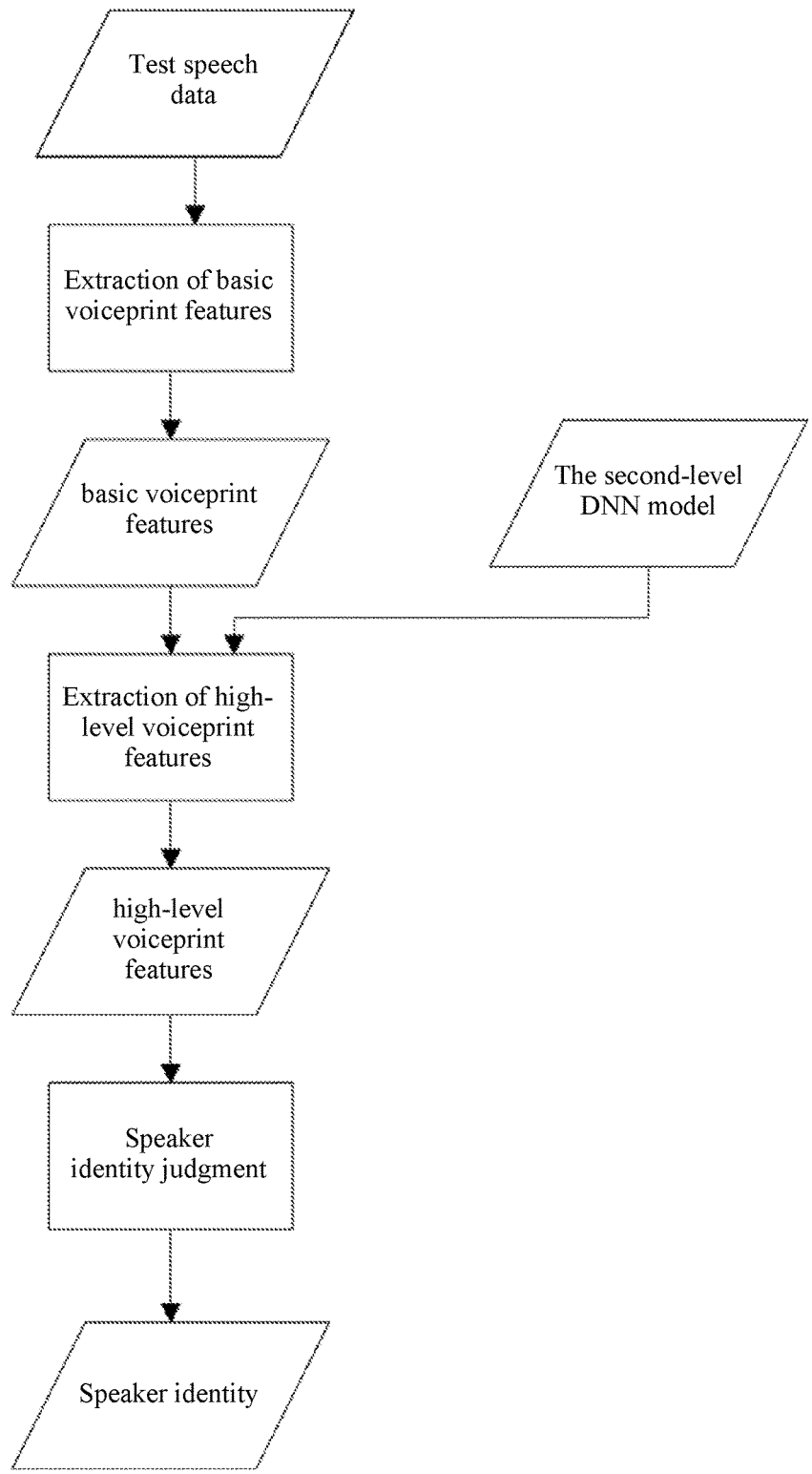
FIG. 6 is a process schematic diagram for verifying a speaker based on some embodiments of the present invention.

FIG. 6 is a schematic diagram of a speaker testing procedure in accordance with some embodiments of the present invention.

As shown in FIG. 6, in some embodiments, the present invention can apply the second-level DNN model to extract the high-level feature sequence of test information (e.g., a test speech sample from a speaker), and establish a test Gaussian model corresponding to the high-level feature sequence of this test information, in order to obtain model parameters for the test information. Then, the speaker's identity can be recognized through calculating the Kullback-Leibler (KL) distance between the registered Gaussian model and test Gaussian model.

Specifically, in some embodiments, first, the test speech data from the speaker is obtained. Basic voiceprint features extraction for the test speech data is conducted to obtain basic voiceprint features for the test speech data. Then, by applying the second-level DNN model, high-level voiceprint features of the test speech data is extracted from the basic voiceprint features. Then, a test Gaussian model corresponding to the high-level voiceprint features is generated, which is the test model for the speaker. Then, test model of the speaker is compared with the registered model of the speaker to finally determine/verify the identity of the speaker who provided the test speech sample.

In fact, the comparison process of the test model of the speaker with registered model of the speaker can be conducted through many ways, for example, by calculating the KL distance between the test model and the registered model of the speakers. In the speaker verification scenario, it is determined whether the distance between the test model and the registered model of the speakers is less than a preset threshold. If yes, it is determined that the speaker of the test speech is the registered speaker.

In the speaker identification scenario, the smallest value of the distance between this current speaker's test model and the respective registered models of multiple registered speakers is first identified. Then, the registered speaker corresponding to the smallest value of the distance is identified as the current speaker of the test speech.

Based on the aforementioned specific analysis, embodiments of the present invention also put forward a type of voiceprint recognition device.

Figure 7:
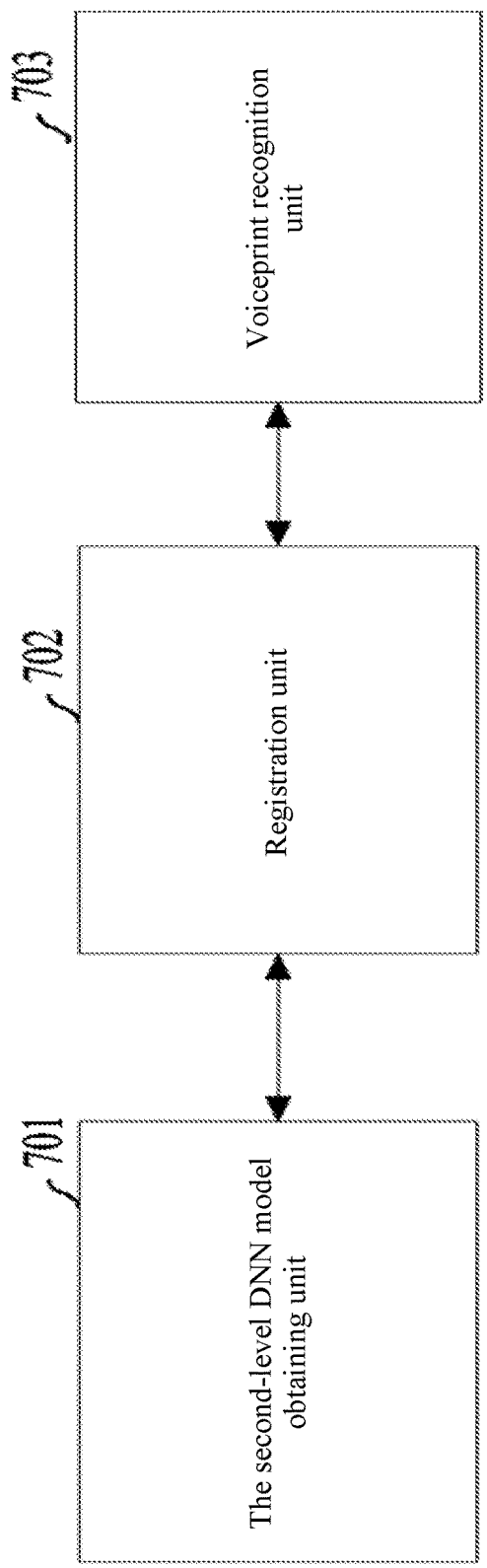
FIG. 7 is a structural schematic diagram of a voiceprint recognition device based on some embodiments of the present invention.

FIG. 7 is a structural schematic diagram of a voiceprint recognition device based on the embodiments of the present invention;

As is shown in FIG. 7, this exemplary device include: a second-level DNN model obtaining unit 701, a registration unit 702, and a voiceprint recognition unit 703, among which:

The second-level DNN model obtaining unit 701 is configured to establish the first-level DNN model based on unlabeled speech data, and to train the first-level DNN model based on labeled speech data, in order to obtain the second-level DNN model;

The registration unit 702 is configured to apply the second-level DNN model to register the high-level voiceprint features of a speaker and associated speaker label;

The voiceprint recognition unit 703 is configured to receive the test speech data, extract the high-level voiceprint features of the test speech from the test speech data based on the second-level DNN model, and determine the speaker's identity based on the high-level voiceprint features of the test speech.

In some embodiments, the second-level DNN model obtaining unit 701 is further configured to extract the basic voiceprint features of the unlabeled speech data from the unlabeled speech data, then, based on this basic voiceprint features of the unlabeled speech data, establish the initial model for the DNN model used for extracting the high layer voiceprint features.

In some embodiments, the second-level DNN model obtaining unit 701 is configured to extract the basic voiceprint features of the labeled speech data from the labeled speech data, to train the first-level DNN model based on this labeled speech basic voiceprint features, in order to obtain the second-level DNN model used for extracting the speaker-dependent high-level voiceprint features.

In some embodiments, the second-level DNN model obtaining unit 701 is configured to apply the sparse coding limiting rules or the maximum cross entropy rules to train the first-level DNN model to obtain the second-level DNN model based on the labeled speech data.

In some embodiments, the second-level DNN model obtaining unit 702 is configured to train the first-level DNN model to obtain the second-level DNN model based on the constraint that the distance between the high-level voiceprint features obtained from different speech data of the same speaker should decrease and the distance between the high-level voiceprint features obtained from the same speech data of different speakers should increase through training.

Preferably, the registration unit 702 is configured to extract the basic voiceprint features of a registering speaker from registration speech data of the registering speaker, and apply the second-level DNN model to obtain the high-level voiceprint features of the registering speaker from the basic voiceprint features of the registering speaker; and establish a corresponding relation between the high-level voiceprint features of the registering speaker and a speaker label of the registering speaker.

In some embodiments, the voiceprint recognition unit 703 is configured to extract the basic voiceprint features of a test speech from the test speech data; based on the second-level DNN model and according to the basic voiceprint features of the test speech to obtain the high-level voiceprint features of the test speech; and then based on the high-level voiceprint features of test speech, determine the speaker identity for the test speech.

In some embodiments, the voiceprint recognition unit 703 is configured to extract the high-level voiceprint features of the test speech from the test speech data based on the second-level DNN model and establish a Gaussian model of the high-level voiceprint features of the test speech; calculate the distance between the Gaussian model of the high-level voiceprint features of the test speech and the Gaussian model of the registered high-level voiceprint features, and then determine the speaker label for the test speech based on the distance.

It is acceptable to integrate the device shown in FIG. 7 into hardware entities of a variety of network. For instance, it is acceptable to integrate the voiceprint recognition device to: devices including feature phones, smart phones, palmtops, personal computers (PC), tablet computers, or personal digital assistants (PDAs), etc.

In fact, the voiceprint recognition device mentioned in the embodiments of the present invention can be implemented in various formats. For example, through application program interface following certain specifications, the voiceprint recognition device can be written as a plug-in installed in a natural language processing server, and/or packaged as an application used for downloading by users themselves as well. When written as a plug-in, the invention can be implemented in various plug-in forms including ocx, dll, cab, etc. And it is acceptable to implement the voiceprint recognition device mentioned in the embodiment of the present invention through specific technologies including Flash plug-in, RealPlayer plug-in, MMS plug-in, MI stave plug-in, ActiveX plug-in, etc.

Through storage methods of instruction or instruction set, the voiceprint recognition device mentioned in the embodiment of the present invention can be stored in various storage media. These storage media include but not limited to: floppy disk, CD, DVD, hard disk, Nand flash, USB flash disk, CF card, SD card, MMC card, SM card, Memory Stick (Memory Stick), xD card, etc.

In addition, the voiceprint recognition device mentioned in the embodiment of the present invention can also be applied to storage medium based on Nand flash, for example, USB flash disk, CF card, SD card, SDHC card, MMC card, SM card, Memory Stick, xD card and so on.

In summary, embodiments of the present invention include: based on unlabeled speech data, establishing the first-level DNN model; based on labeled speech data, training the first-level DNN model to obtain the second-level DNN model; using the second-level DNN model to register the high-level voiceprint features of a speaker and associated speaker label; receiving test speech data; based on the second-level DNN model, extracting the high-level voiceprint features of the test speech from the test speech data; based on the high-level voiceprint features of the test speech, determining the speaker ID. Thus it can be seen that after the application of the embodiment of the present invention, it is possible to start effectively from the fundamental speech spectrum characteristics, through the use of deep neural networks, automatically learn the high-level speaker information that are contained in the speech signals and that have proven to be robust against noise interferences. Thus, noise interference can be effectively resisted.

In addition, the embodiment of the present invention can be applied to the feature extraction end under the circumstances with limited computational budget, where robust characteristics can be directly obtained and used for in speaker recognition applications. In the absence of computing resource limitations, after these characteristics have been obtained, the embodiments of the present invention can still utilize the current channel compensation algorithms and obtain further performance improvements.

Figure 8:
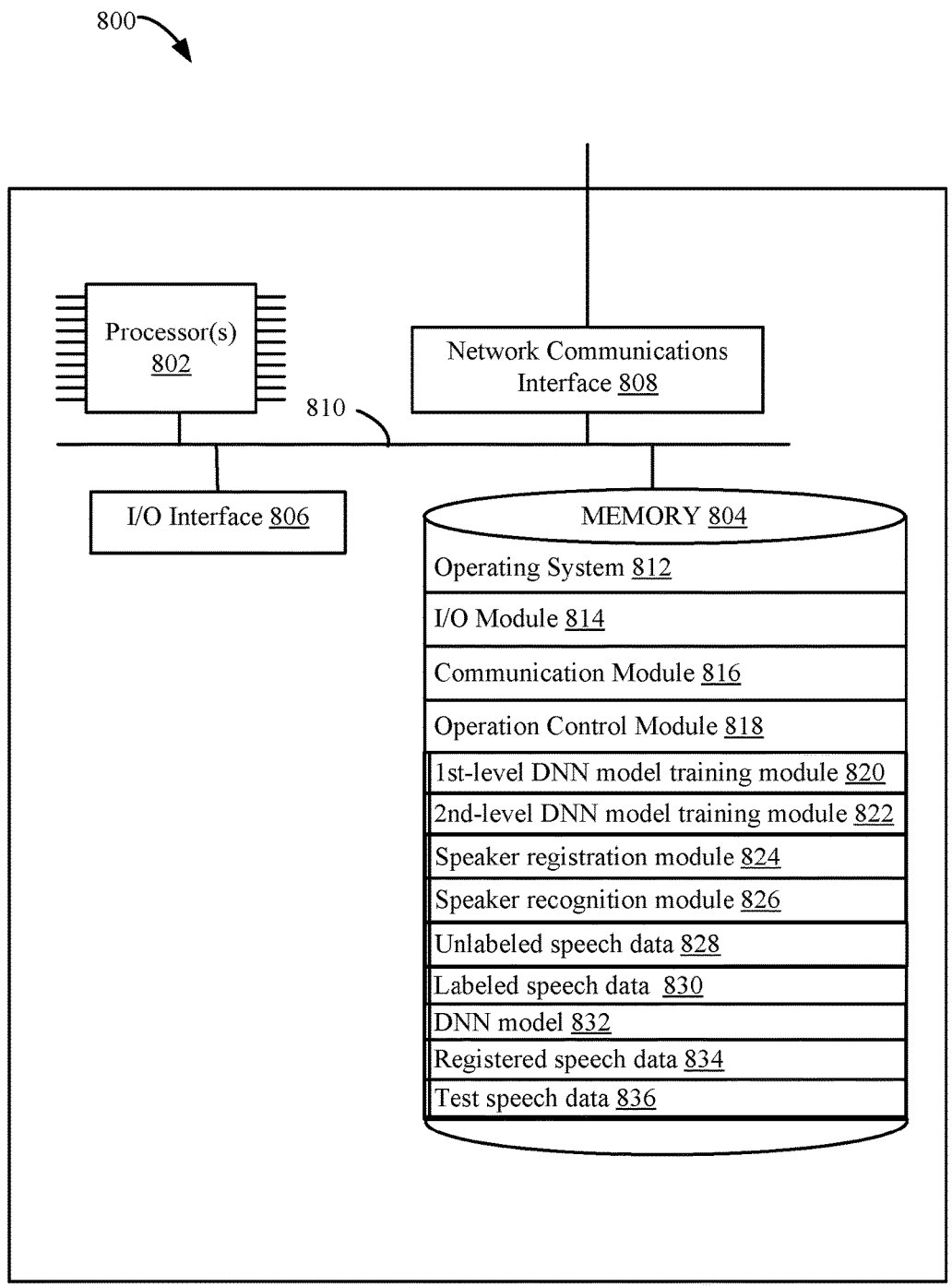
FIG. 8 is a block diagram of an exemplary device for voiceprint recognition in accordance with some embodiments.

FIG. 8 is a block diagram of a system 800 that implements the present invention in accordance with some embodiments.

As shown in FIG. 8, the system 800 includes one or more processing units (or "processors") 802, memory 804, an input/output (I/O) interface 806, and a network communications interface 808. These components communicate with one another over one or more communication buses or signal lines 810. In some embodiments, the memory 804, or the computer readable storage media of memory 804, stores programs, modules, instructions, and data structures including all or a subset of: an operating system 812, an I/O module 814, a communication module 816, and an operation control module 818. The one or more processors 802 are coupled to the memory 804 and operable to execute these programs, modules, and instructions, and reads/writes from/to the data structures.

In some embodiments, the processing units 802 include one or more microprocessors, such as a single core or multi-core microprocessor. In some embodiments, the processing units 802 include one or more general purpose processors. In some embodiments, the processing units 802 include one or more special purpose processors. In some embodiments, the processing units 802 include one or more personal computers, mobile devices, handheld computers, tablet computers, or one of a wide variety of hardware platforms that contain one or more processing units and run on various operating systems.

In some embodiments, the memory 804 includes high-speed random access memory, such as DRAM, SRAM, DDR RAM or other random access solid state memory devices. In some embodiments the memory 804 includes non-volatile memory, such as one or more magnetic disk storage devices, optical disk storage devices, flash memory devices, or other non-volatile solid state storage devices. In some embodiments, the memory 804 includes one or more storage devices remotely located from the processing units 802. The memory 804, or alternately the non-volatile memory device(s) within the memory 804, comprises a computer readable storage medium.

In some embodiments, the I/O interface 806 couples input/output devices, such as displays, a keyboards, touch screens, speakers, and microphones, to the I/O module 814 of the system 800. The I/O interface 806, in conjunction with the I/O module 814, receive user inputs (e.g., voice input, keyboard inputs, touch inputs, etc.) and process them accordingly. The I/O interface 806 and the user interface module 814 also present outputs (e.g., sounds, images, text, etc.) to the user according to various program instructions implemented on the system 800.

In some embodiments, the network communications interface 808 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 808 enables communication between the system 800 with networks, such as the Internet, an intranet and/or a wireless network, such as a cellular telephone network, a wireless local area network (LAN) and/or a metropolitan area network (MAN), and other devices. The communications module 816 facilitates communications between the system 800 and other devices (e.g., other devices participating in the parallel training and/or decoding processes) over the network communications interface 808.

In some embodiments, the operating system 802 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

As shown in FIG. 8, the system 800 stores the operation control module 818 in the memory 804. In some embodiments, the operation control module 818 further includes the followings sub-modules, or a subset or superset thereof: a first-level DNN model training module 820, a second-level DNN model training module 822, a speaker registration module 824, and a speaker recognition module 826. In addition, each of these modules has access to one or more of the following data structures and data sources of the operation control module 818, or a subset or superset thereof: a training corpus of unlabeled speech data 828, a training corpus of labeled speech data 830, a DNN model 832, registered speech data 834, and test speech data 836. In some embodiments, the operation control module 818 optionally includes one or more other modules to provide other related functionalities described herein. More details on the structures, functions, and interactions of the sub-modules and data structures of the operation control module 818 are provided with respect to FIGS. 1-7, and accompanying descriptions.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
 at a device having one or more processors and memory:
  establishing a first-level Deep Neural Network (DNN) model based on unlabeled speech data, the unlabeled speech data containing no speaker labels and the first-level DNN model specifying a plurality of basic voiceprint features for the unlabeled speech data;

establishing a second-level DNN model by tuning the first-level DNN model based on labeled speech data, the labeled speech data containing speech samples with respective speaker labels, wherein the second-level DNN model specifies a plurality of high-level voiceprint features, the high-level voiceprint features including at least one of formant features and fundamental frequency features;

using the second-level DNN model, registering a first high-level voiceprint feature sequence for a user based on a registration speech sample received from the user; and performing speaker verification for the user based on the first high-level voiceprint feature sequence registered for the user, further comprising:

receiving, from the user, a test speech sample;

obtaining a second high-level voiceprint feature sequence based on the test speech sample using the first-level DNN model and the second-level DNN model in sequence;

determining a distance between the second high-level voiceprint feature sequence and the first high-level voiceprint feature sequence registered for the user; and in accordance with a determination that the distance between the second high-level voiceprint feature sequence and the first high-level voiceprint feature sequence is less than a preset threshold, automatically, without user intervention, verifying the identity of the user.

2. The method of claim 1, wherein establishing the second-level DNN model by tuning the first-level DNN model based on labeled speech data comprises:

imposing at least two constraints on the second-level DNN model, including: (1) distances between characteristic voiceprints generated from speech samples of different speakers increase with training, and (2) distances between characteristic voiceprints generated from speech samples of the same speaker decrease with training.

3. The method of claim 1, wherein establishing the second-level DNN model by tuning the first-level DNN model based on labeled speech data comprises:

applying sparse coding limit rules to train the first-level DNN model based on the labeled speech data.

4. The method of claim 1, wherein establishing the second-level DNN model by tuning the first-level DNN model based on labeled speech data comprises:

applying maximum cross entropy rules to train the first-level DNN model based on the labeled speech data.

5. The method of claim 1, wherein registering the first high-level voiceprint feature sequence for the user based on the registration speech sample received from the user comprises:

obtaining a basic voiceprint feature sequence for the user from the registration speech sample based on the first-level DNN model; and providing the basic voiceprint feature sequence for the user as input to the second-level DNN model to obtain the first high-level voiceprint feature sequence for the user.

6. The method of claim 1, wherein determining the distance between the second high-level voiceprint feature sequence and the first high-level voiceprint feature sequence registered for the user comprises:

determining a Euclidean distance between respective Gaussian models of the second high-level voiceprint feature sequence obtained from the test speech sample and the first high-level voiceprint feature sequence registered for the user.

7. A voiceprint recognition system, comprising:

one or more processors; and memory storing instructions that, when executed by the one or more processors, cause the processors to perform operations comprising:

establishing a first-level Deep Neural Network (DNN) model based on unlabeled speech data, the unlabeled speech data containing no speaker labels and the first-level DNN model specifying a plurality of basic voiceprint features for the unlabeled speech data;

establishing a second-level DNN model by tuning the first-level DNN model based on labeled speech data, the labeled speech data containing speech samples with respective speaker labels, wherein the second-level DNN model specifies a plurality of high-level voiceprint features, the high-level voiceprint features including at least one of formant features and fundamental frequency features;

using the second-level DNN model, registering a first high-level voiceprint feature sequence for a user based on a registration speech sample received from the user; and performing speaker verification for the user based on the first high-level voiceprint feature sequence registered for the user, further comprising:

receiving, from the user, a test speech sample;

obtaining a second high-level voiceprint feature sequence based on the test speech sample using the first-level DNN model and the second-level DNN model in sequence;

determining a distance between the second high-level voiceprint feature sequence and the first high-level voiceprint feature sequence registered for the user; and in accordance with a determination that the distance between the second high-level voiceprint feature sequence and the first high-level voiceprint feature sequence is less than a preset threshold, automatically, without user intervention, verifying the identity of the user.

8. The system of claim 7, wherein establishing the second-level DNN model by tuning the first-level DNN model based on labeled speech data comprises:

imposing at least two constraints on the second-level DNN model, including: (1) distances between characteristic voiceprints generated from speech samples of different speakers increase with training, and (2) distances between characteristic voiceprints generated from speech samples of the same speaker decrease with training.

9. The system of claim 7, wherein establishing the second-level DNN model by tuning the first-level DNN model based on labeled speech data comprises:

applying sparse coding limit rules to train the first-level DNN model based on the labeled speech data.

10. The system of claim 7, wherein establishing the second-level DNN model by tuning the first-level DNN model based on labeled speech data comprises:

applying maximum cross entropy rules to train the first-level DNN model based on the labeled speech data.

11. The system of claim 7, wherein determining the distance between the second high-level voiceprint feature sequence and the first high-level voiceprint feature sequence registered for the user comprises:
determining a Euclidean distance between respective Gaussian models of the second high-level voiceprint feature sequence obtained from the test speech sample and the first high-level voiceprint feature sequence registered for the user.

12. The system of claim 7, wherein registering the first high-level voiceprint feature sequence for the user based on the registration speech sample received from the user comprises:
obtaining a basic voiceprint feature sequence for the user from the registration speech sample based on the first-level DNN model; and
providing the basic voiceprint feature sequence for the user as input to the second-level DNN model to obtain the first high-level voiceprint feature sequence for the user.

13. A non-transitory computer-readable medium storing instructions that, when executed by a computer system with one or more processors, cause the processors to perform operations comprising:
establishing a first-level Deep Neural Network (DNN) model based on unlabeled speech data, the unlabeled speech data containing no speaker labels and the first-level DNN model specifying a plurality of basic voiceprint features for the unlabeled speech data;
establishing a second-level DNN model by tuning the first-level DNN model based on labeled speech data, the labeled speech data containing speech samples with respective speaker labels, wherein the second-level DNN model specifies a plurality of high-level voiceprint features, the high-level voiceprint features including at least one of formant features and fundamental frequency features;
using the second-level DNN model, registering a first high-level voiceprint feature sequence for a user based on a registration speech sample received from the user; and
performing speaker verification for the user based on the first high-level voiceprint feature sequence registered for the user, further comprising:
receiving, from the user, a test speech sample;
obtaining a second high-level voiceprint feature sequence based on the test speech sample using the first-level DNN model and the second-level DNN model in sequence;
determining a distance between the second high-level voiceprint feature sequence and the first high-level voiceprint feature sequence registered for the user; and
in accordance with a determination that the distance between the second high-level voiceprint feature sequence and the first high-level voiceprint feature sequence is less than a preset threshold, automatically, without user intervention, verifying the identity of the user.

14. The computer-readable medium of claim 13, wherein establishing the second-level DNN model by tuning the first-level DNN model based on labeled speech data comprises:
imposing at least two constraints on the second-level DNN model, including: (1) distances between characteristic voiceprints generated from speech samples of different speakers increase with training, and (2) distances between characteristic voiceprints generated from speech samples of the same speaker decrease with training.

15. The computer-readable medium of claim 13, wherein establishing the second-level DNN model by tuning the first-level DNN model based on labeled speech data comprises:
applying sparse coding limit rules to train the first-level DNN model based on the labeled speech data.

16. The computer-readable medium of claim 13, wherein establishing the second-level DNN model by tuning the first-level DNN model based on labeled speech data comprises:
applying maximum cross entropy rules to train the first-level DNN model based on the labeled speech data.

17. The computer-readable medium of claim 13, wherein registering the first high-level voiceprint feature sequence for the user based on the registration speech sample received from the user comprises:
obtaining a basic voiceprint feature sequence for the user from the registration speech sample based on the first-level DNN model; and
providing the basic voiceprint feature sequence for the user as input to the second-level DNN model to obtain the first high-level voiceprint feature sequence for the user.

18. The computer-readable medium of claim 13, wherein determining the distance between the second high-level voiceprint feature sequence and the first high-level voiceprint feature sequence registered for the user comprises:
determining a Euclidean distance between respective Gaussian models of the second high-level voiceprint feature sequence obtained from the test speech sample and the first high-level voiceprint feature sequence registered for the user.

* * * * *